Jan. 4, 1949.   F. C. SAWATZKI   2,458,209
COUPLING
Filed March 11, 1946
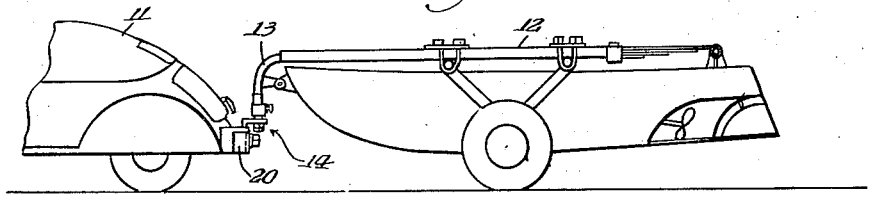
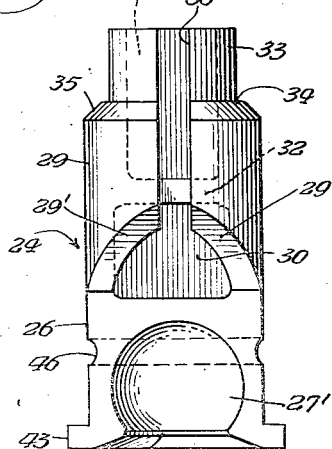
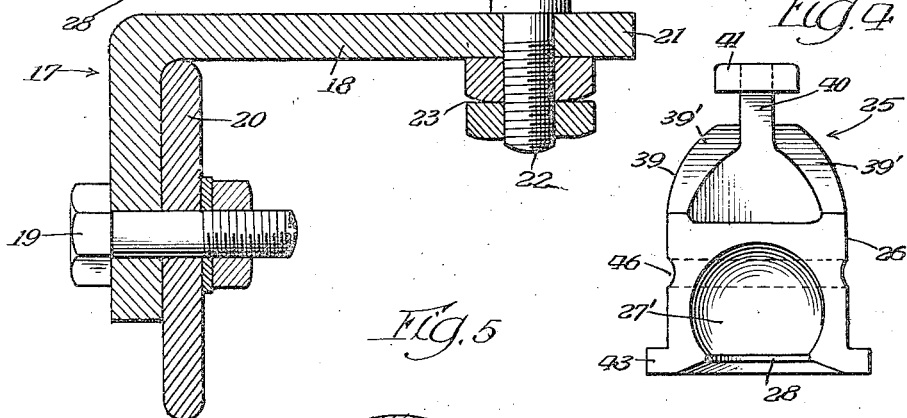
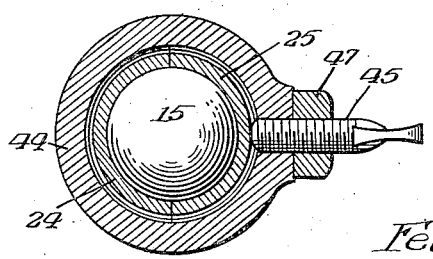
Inventor
Felix C. Sawatzki
By:— Spencer, Marzall, Johnston & Cook
Attys Patented Jan. 4, 1949

2,458,209

UNITED STATES PATENT OFFICE 2,458,209

COUPLING

Felix C. Sawatzki, Coloma, Mich., assignor to Sporting Specialties Company, Coloma, Mich., a corporation of Michigan Application March 11, 1946, Serial No. 653,614

7 Claims. (Cl. 280—33.17)

The present invention relates in general to couplings, and has more particular reference to a rapidly operable coupling or hitch device particularly well adapted for interconnecting trailers and the like, in readily detachable fashion, with towing tractors.

An important object of the invention is to provide a coupling of the character mentioned and characterized in that the coupling is of simple, yet rugged, construction adapted for manufacture at low cost and for ready assembly, the coupling being quickly and easily operable to provide a quick detachable trailer hitch; a further object being to provide a detachable trailer hitch coupling, particularly well suited for connecting a trailer hitched to an automobile, as a tractor, for overland transportation.

A further object of the invention is to provide a trailer coupling embodying cooperating parts forming a socket and interfitting ball, wherein the socket forming portions comprise split parts readily connectible with the ball element and as readily disconnectible therefrom, including readily operable latch means for securing the cooperating parts in connected relationship; a further object being to provide an exceedingly simple and readily operable lock for securing the parts in latched condition.

Another important object is to form the cooperating socket-forming elements so that they are permanently interconnected and hence cannot be accidentally disassembled even when disconnected from the cooperating ball element of the cooperating ball element of the coupling.

Another important object is to make the socket-forming elements as relatively inexpensive castings, readily fabricated at low cost; a further object being to form said elements for interfitting engagement by a simple assembly operation to thereafter prevent accidental separation of the parts.

Another important object is to provide a ball and socket-coupling wherein the ball and the socket forming elements thereof may be readily mounted in operating position on trailer and tractor devices for the detachable interconnection thereof for overland transportation; a further object being to form the socket-forming elements of the coupling for easy attachment, as on the towing tongue of a trailer, in position to present the socket in a downwardly facing direction whereby to receive the cooperating upwardly extending ball element of the coupling.

A further object is to provide coupling latch means comprising a member movable downwardly toward latching position on the socket-forming members of the coupling, whereby the latch means may be at all times urged toward latching position by gravity.

Another important object is to provide a coupling having socket-forming elements adapted for permanent attachment, as by welding the same in place in the tubular end of the towing tongue of a trailer; a further object being to provide a coupling latch comprising an annular ring slidable on the socket-forming portions of the coupling; a further object being to mount said socket-forming coupling elements in position such that said annular latching ring may be normally urged by gravity toward latching position on said socket-forming portions, whereby the force of gravity aids in retaining the coupling in latched position to secure the connected trailer to the tractor.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a side elevation of a tractor and connected trailer towingly attached to the tractor by means of a coupling embodying the present invention;

Fig. 2 is an enlarged sectional view through the coupling shown in Fig. 1;

Figs. 3 and 4 are perspective views of cooperating socket forming elements of the coupling; and Fig. 5 is a sectional view taken substantially along the line 5—5 in Fig. 2.

To illustrate the invention, the drawings show a tractor 11, comprising an automotive land vehicle, a wheeled trailer 12, having a towing tongue 13, and coupling means 14, embodying the present invention, for detachably connecting the trailer and tractor for overland towing transportation.

The coupling means 14 comprises a ball element 15 and socket-forming means 16 providing a socket for receiving the ball element. The socket-forming means 16 and the ball element comprise separable or detachable coupling elements adapted for connection the one on the tractor and the other on the trailer, the ball element being preferably, though not essentially, mountable on the tractor, and the socket-forming means 16 being preferably, though not essentially, mounted on the trailer.

As shown, the ball element 15 is provided with mounting means 17 for connecting the same on the tractor, said mounting means 17, as shown, comprising a bracket 18 adapted to be secured, as by means of a fastening bolt 19, upon a frame portion of the tractor, the bracket being attached to the bumper 20 of the tractor, in the illustrated embodiment.

As shown in Fig. 2 of the drawings, the bracket 18 has a mounting portion 21 extending from the tractor, and the ball element is secured on said mounting portion 21 in position extending upwardly thereof. To this end the ball 15 may, as shown, be provided with a threaded stem 22 and may be secured, on the mounting portion 21, as by means of clamping nuts 23 on the stem 22. Any other suitable or preferred manner of mounting the ball element, however, may be employed.

The coupling means 16 comprises cooperating socket-forming elements 24 and 25, each preferably having identical socket-forming portions 26, the portion 26 in each of the cooperating elements preferably having semi-cylindrical configuration with a hemispherical cavity 27' formed in and opening laterally on the flat face of said semi-cylindrical portion 26. The hemispherical cavity opens also in an axial direction at an end of the portion 26 through a semi-circular opening 28. As a result of the foregoing structure, when the flat faces of the portions 26 of the elements 24 and 25 are brought into aligned facing relationship, the hemispherical cavities 27', together, form the spherical cavity 27 sized to snugly receive the ball element 15, with the connected stem 22 thereof extending outwardly through the circular opening formed by the opening 28.

The element 24, in addition to its socket-forming portion 26, comprises a cylindrical mounting portion 29, one side of which has cylindrical surfaces lying in a common curved plane with the cylindrical surfaces of the socket-forming portion 26. The other side of the mounting portion 29 projects outwardly of the flat socketed surface of the portion 26, the so outwardly projecting portions having inclined surfaces 29' at and extending from the flat socketed surface of the portion 26. The mounting portion 29 is preferably made hollow, being formed with an internal cavity 30 adjacent the socket forming portion 26, said cavity 30 opening upon the inclined surface 29'. The mounting portion 29 is also preferably formed with a cavity 31 opening at the end of the mounting portion 29 remote from the socket forming portion 26, said cavities 30 and 31 being separated by an internal wall portion 32 comprising an integral part of the mounting portion 29. The end of the mounting portion 29 also is preferably, though not essentially, formed with a restricted neck 33 at the end thereof remote from the socket forming portion 26, said neck forming an annular shoulder 34 at its junction with the mounting portion 29. The shoulder 34, if desired, may be beveled, as at 35.

The mounting portion 29 also is formed with a lateral slot 36 in the portions thereof which project outwardly of the flat socketed face of the portion 26, said slot extending through the walls of the mounting portion 29 and giving access to the cavities 30 and 31.

The coupling member 25, also, in addition to its socket forming portion 26, has a connecting portion 39 integral with the portion 26 and comprising a cylindrical wall extending from said portion, said cylindrical wall having inclined surfaces 39', facing away from the socketed portion 26, and extending on each side of an upstanding finger 40, the terminal end of which extends inwardly of said cylindrical wall and provides an enlarged head 41. The upstanding finger 40 is sized to fit freely within the slot 36 of the element 24. The head 41, however, projects on opposite sides of the finger 40 and is offset for reception within the cavity 31. The head also is sufficiently large to prevent the same from passing laterally through the slot 36. The member 25 consequently can be interfittingly connected on the member 24 by passing the head 41 into the open end of the socket 31, while passing the finger 40 into the open end of the slot 36. When so assembled, the member 25 will be rockingly retained on the member 24, the head 41 making rocking engagement with the walls of the cavity 31 on opposite sides of the slot 36, the finger 40 being freely rockable within the slot 36.

The head 41 also may engage the wall portion 32 of the element 24 to limit movement thereof on the member 24, in an axial direction away from the open end of the cavity 31. When the head 41 is thus engaged with the wall 32 as a rocking seat, the portions 26 of both elements 24 and 25 may be brought into socket-forming registration. When in such position, the shoulders 39' of the element 25 will be in engagement with the facing shoulders 29' of the element 24, and the cylindrical wall 39 of the element 25 will fit upon and close the cavity 30. As a consequence, when the parts 24 and 25 are in socket-forming registration, the cavity-forming portions 26 of the elements cooperate to form a substantially cylindrical block having a cavity for interfittingly receiving the ball element 15. The member 25, however, may be rocked on the member 24 to separate the socket-forming portions 26 and thereby release the ball element 15 from interlocking engagement with the elements 25.

The coupling elements 24 and 25 may be mounted in position, as on the towing tongue 13 of the trailer, in any suitable or preferred fashion. It is preferable, however, that the coupling members 24 and 25 be so mounted that the ball receiving socket faces downwardly in position to receive the upwardly extending ball element 15. Where the towing tongue 13 comprises a tubular member, or a member having a cavity or socket in the end thereof, the necked arrangement 33 facilitates the attachment of the coupling elements 24 and 25 by welding the neck portion 33, as indicated at 42, in the socketed end of the towing tongue 13. Attachment of the member 24 to the tongue in this fashion will lock the head 41 and finger 40 of the element 25 against removal from interfitting and rocking position within the slot 36. As a consequence, after the element 24 has been mounted, there is no possibility, thereafter, that the element 25 may become disconnected or disassociated from the assembly and lost.

Any suitable or convenient means may be employed to secure the elements 24 and 25 together in position to hold the ball member 15 in the socket formed by the cavities 27. The invention, however, contemplates the provision of exceedingly simple and inexpensive latching mechanism which also, after the element 24 has been mounted on the towing tongue 13, cannot become disassociated from the assembly.

To this end, the elements 24 and 25 are provided each with an identical outstanding semi-circular flange 43 adapted to engage and support a latch member comprising a ring 44 sized to embrace the cylindrical surfaces of the socket forming portions 26 when the elements are in socket forming position. The ring 44, however, is freely slidable on the cylindrical surfaces of the elements 24 and 25 and may consequently be raised from the locking position shown in Fig. 2 to a releasing position upwardly of the supporting wall 32. When the ring is in such position, the coupling element 25 may be rocked on the element 24 to separate the socket forming portions 26 and thus release the ball member 15, or allow the ball member to be inserted. It will be seen that where the elements 24 and 25 are so mounted as to prevent the ball receiving socket in downwardly facing position, the latching ring 44 will normally be urged by gravity toward latching position. Means, however, is also preferably provided in the form of a lock screw 45 extending through the ring 44 and having an end adapted for locking reception in a circumferential groove 46 formed in the outwardly facing cylindrical surfaces of the socket forming portions 26. The locking screw 45 may be provided with a manually operable head, and a manually operable lock nut 47, also, may be provided for holding the lock screw in locking position.

It will be seen from the foregoing that the present invention provides an exceedingly simple, inexpensive hitch coupling, readily operable to permit the rapid interconnection of tractor and trailer, the coupling being easily disconnected to uncouple the trailer from the tractor. The parts of the coupling are arranged to provide firm, positive locking of the coupling parts in coupled relationship, including the gravity-actuated latch means 44 at all times urged toward latching position whereby the coupling may not accidentally become unlatched and disconnected even if the lock screw be in unlocked position. The coupling is exceedingly inexpensive to make, comprising as it does the cast elements 24 and 25, the ball element 15 and its mounting means 17, the latch ring 44, and the locking screw. All of the parts may be produced at very low cost. The coupling, nevertheless, is of rugged construction adapted to give satisfactory performance through an extended service life, there being nothing to get out of order.

It is thought that the invention and its numerous attendant advantages will be fully understood from the foregoing description, and it is obvious that numerous changes may be made in the specific form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A coupling comprising a ball element, a pair of interlocking cooperating socket-forming members including one member rockable on the other, into ball-retaining position, and latch means for securing said members in ball-retaining position, said latch means comprising a sleeve member embracing said socket-forming members to hold them in ball retaining position, said sleeve member being retractable on said cooperating members to permit ball-releasing movement thereof.

2. A coupling comprising a ball element, a pair of cooperating socket-forming members including interengaging members, one of which is rockably shiftable on the other into ball-retaining position and also longitudinally shiftable between ball-retaining and ball-releasing positions, and latch means for securing said members in ball-retaining position, said latch means embodying a sleeve member embracing said socket-forming members to latch them in ball-retaining position, said sleeve member being retractable on said cooperating members to permit ball-releasing movement thereof, and locking means to secure said sleeve member in latching position on said socket-forming members.

3. A coupling comprising a ball element, and a pair of cooperating socket-forming members, one of said members comprising a sleeve and a portion, at an end of said sleeve and formed to provide a segment of a ball-receiving socket, the other member comprising a portion forming a segment of a ball-receiving socket, and an integral mounting finger, said sleeve portion being formed with a lateral, longitudinally extending slot, sized to receive said finger, and an internal seat-forming shoulder, said finger having an enlarged head sized to extend within said sleeve and to prevent retraction of said finger through said slot, said head being rockably receivable on said seat to support said member thereon for rocking movement between ball-releasing and ball-retaining positions, the member, when in ball-retaining position, presenting its socket-forming segment in registration with the corresponding segment of said other member whereby the segments cooperate to form a ball-receiving socket.

4. A coupling comprising a ball element, a pair of cooperating socket-forming members including a cylindrical mounting member and a holding member shiftable on the mounting member, between ball-retaining and ball-releasing positions, said mounting member having a central cavity opening at one end thereof and a lateral slot opening through the wall of the mounting member upon said cavity, said slot having an open end at the said end of the said mounting member, said mounitng member having a semi-cylindrical socket-forming portion, at its other end, said portion having a flat face extending in a plane substantially diametrally of said cylindrical mounting member, said flat face having a hemispherical cavity therein, said holding member having a semi-cylindrical socket-forming portion providing a flat face formed with a hemispherical cavity, and an integral finger adapted to extend in the lateral slot of said mounting member, said finger having an enlarged head for reception in said central cavity of said mounting member whereby to rockingly mount said holding member thereon, with said finger in said slot, means to mount said cylindrical mounting member on a support in position blocking removal of said finger from said mounting member through the open end of the slot, and latch means comprising a sleeve member sized to embrace said semi-cylindrical socket-forming portions to hold them in ball-retaining position, with the flat faces thereof in facing engagement, said sleeve member being retractable on said members to permit ball-releasing movement thereof.

5. A coupling comprising a ball element and a pair of co-operating socket-forming members, one of said members comprising a sleeve and a portion at the end of said sleeve formed to provide a segment of a ball-receiving socket, the other member comprising a portion forming a segment of a ball-receiving socket, and an integral mounting finger, the said sleeve portion being formed with a lateral, longitudinally extending slot, sized to receive said finger, and an internal seat-forming shoulder, said finger having an enlarged head sized to extend within said sleeve and to prevent retraction of said finger through said slot, said head being rockably receivable on said seat to support said member thereon for rocking movement between ball-releasing and ball-retaining positions, the member, when in ball-retaining position, presenting its socket-forming segment in registration with the corresponding segment of said other member, whereby the segments co-operate to form a ball-receiving socket, means embodying a sleeve slidable upon said socket-forming members and aadpted to encompass them for maintaining them in ball-retaining position.

6. A coupling embodying a ball element, a pair of co-operating socket-forming members including one member shiftable on the other, between ball-retaining and ball-releasing positions, one of said members having a laterally opening, longitudinally extending slot, a seat disposed transversely of said slot, a finger on the other member extending into and movable lengthwise of the slot, a head on said finger and movable with said finger out of the slot, said head engaging and rockable upon said seat, and means for maintaining said members in ball-retaining position with respect to each other.

7. A coupling embodying a ball element, a pair of co-operating socket-forming members including one member shiftable on the other, between ball-retaining and ball-releasing positions, one of said members having a laterally opening, longitudinally extending slot, a seat disposed transversely of said slot, a finger on the other member extending into and movable lengthwise of the slot, a head on said finger and movable with said finger out of the slot, said head engaging and rockable upon said seat, a sleeve freely slidable on said members for locking them against separation, and means for maintaining said sleeve in locking position.

FELIX C. SAWATZKI.

REFERENCES CITED

The following references are of record in the file of this patent:

UNITED STATES PATENTS

| Number | Name | Date |
|---|---|---|
| 2,035,486 | Larson | Mar. 31, 1936 |

FOREIGN PATENTS

| Number | Country | Date |
|---|---|---|
| 511,312 | Great Britain | Aug. 16, 1939 |